United States Patent
Raveendran et al.

(10) Patent No.: US 9,049,464 B2
(45) Date of Patent: Jun. 2, 2015

(54) MULTIPLE DESCRIPTION CODING WITH PLURAL COMBINED DIVERSITY

(75) Inventors: Vijayalakshmi R. Raveendran, San Diego, CA (US); PhaniKumar K. Bhamidipati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 13/155,228

(22) Filed: Jun. 7, 2011

(65) Prior Publication Data

US 2012/0314948 A1  Dec. 13, 2012

(51) Int. Cl.
| | |
|---|---|
| *G06K 9/36* | (2006.01) |
| *H04N 21/234* | (2011.01) |
| *H04N 19/137* | (2014.01) |
| *H04N 19/17* | (2014.01) |
| *H04N 19/39* | (2014.01) |
| *H04N 19/587* | (2014.01) |
| *H04N 19/59* | (2014.01) |

(52) U.S. Cl.
CPC ....... *H04N 21/23418* (2013.01); *H04N 19/137* (2014.11); *H04N 19/17* (2014.11); *H04N 19/39* (2014.11); *H04N 19/587* (2014.11); *H04N 19/59* (2014.11)

(58) Field of Classification Search
CPC . H04N 7/50; H04N 7/26351; H04N 7/26643; H04N 13/026
USPC ..................................................... 375/240.01
See application file for complete search history.

(56) References Cited

U.S. PATENT DOCUMENTS

| | | | |
|---|---|---|---|
| 7,436,888 B2 | 10/2008 | Kim et al. | |
| 2003/0197785 A1* | 10/2003 | White et al. | ............. 348/207.99 |
| 2006/0256867 A1 | 11/2006 | Turaga et al. | |
| 2008/0165861 A1 | 7/2008 | Wen et al. | |
| 2009/0268805 A1 | 10/2009 | Shanableh et al. | |

OTHER PUBLICATIONS

Chen et al "Multiple description coding for protecting regions of interest in images," Image and Signal Processing (CISP), 2010 3rd International Congress on , vol. 2, No., pp. 544,547, Oct. 16-18, 2010.*
Parameswaran et al "An Adaptive Slice Group Multiple Description Coding Technique for Real-time Video Transmission over Wireless Networks," Military Communications Conference, 2007. MILCOM 2007. IEEE , vol., No., pp. 1,7, Oct. 29-31, 2007, hereinafter.*

(Continued)

*Primary Examiner* — Jay Au Patel
*Assistant Examiner* — Frank Huang
(74) *Attorney, Agent, or Firm* — Donald C. Kordich

(57) ABSTRACT

An apparatus, system, and method utilizing multi-description coding (MDC) for multimedia content with a plurality of forms of diversity. A source scene can be fragmented into one or more region of interest (ROI) portions and non-ROI portions, based on motion or any other metric of interest. One or more of these portions can further be fragmented by sub-sampling the respective portions to generate a plurality of lower-resolution versions, e.g., with alternating groups of pixels in respective versions. Still further, one or more of these portions can be further fragmented by image frames, e.g., with alternating frames in respective fragments. At least one ROI portion and lower-resolution versions may then be encoded into a plurality of descriptions and transmitted. Utilizing various combinations of ROI diversity, resolution diversity, and frame rate diversity can improve channel utilization and robustness for streaming multimedia content.

32 Claims, 8 Drawing Sheets

(56) References Cited

OTHER PUBLICATIONS

Yang et al "Standard compliant multiple description coding based on regions of interest," Control Conference, 2008. CCC 2008. 27th Chinese, vol., No., pp. 248,252, Jul. 16-18, 2008.*

Chakravorty et al., "MobiStream: Error-Resilient Video Streaming in Wireless WANs using Virtual Channels", Proceedings of IEEE Infocom, 2006, pp. 1-14.

Gong et al., "Novel Content-based Video Coding Scheme for Robust Video Transmission over Ad Hoc Networks", Wireless Communications, Networking and Mobile Computing, Sep. 2009, pp. 1-5.

Chen, X., et al., "Multiple description coding for protecting regions of interest in images", Image and Signal Processing (CISP), 2010 3rd International Congress on, IEEE, Piscataway, NJ, USA, Oct. 16, 2010, pp. 544-547, XP031809678.

International Search Report and Written Opinion—PCT/US2012/041424—ISA/EPO—Oct. 25, 2012.

Parameswaran, V., et al., "An Adaptive Slice Group Multiple Description Coding Technique for Real-time Video Transmission over Wireless Networks", Military Communications Conference, 2007 MILCOM 2007, IEEE, Piscataway, NJ, USA, Oct. 29, 2007, pp. 1-7, XP031232662.

Miguel C.A., et al., "Protection of Regions of Interest Against Data Loss in a Generalized Multiple Description Framework", University of Washington Department of Electrical Engineering Technical Report, 2002, No. UWEE TR-2002-0007, pp. 1-10, URL, https://www.ee.washington.edu/techsite/papers/documents/UWEETR-2001-0007.pdf.

Nystrom M., et al, "Multiple Description Image Coding Using Regions of Interest", Conference Record of the 41th Asilomar Conference on Signals, Systems and Computers, Nov. 4, 2007.

Zhang M.M., et al., "A novel MD video coding scheme for ROI based on H.264", Proceedings of the SPIE 7490, Piageng 2009, Intelligent Information, Control, and Communication Technology for Agricultural Engineering, Jul. 2009.

\* cited by examiner

MULTIPLE DESCRIPTION CODING WITH PLURAL COMBINED DIVERSITY

BACKGROUND

1. Field

The instant disclosure relates generally to wireless communications, and more particularly, to streaming media content on a wireless network.

2. Background

Wireless communication systems are widely deployed to provide various telecommunication services such as telephony, video, data, messaging, and broadcasts. In modern wireless access terminals, increased functionality including highly capable processors, large memory capacities, and increasing numbers of sources of multimedia input (e.g., video cameras, WLAN transceivers, and the like) creates the possibility to generate large amounts of content, which the user of the access terminal may wish to share utilizing the wireless network. However, in a wireless network, an upload of a stream from an access terminal to one or more access terminals or to a server in the cloud is typically constrained by the limited bandwidth of the reverse link (i.e., the uplink at the uploading access terminal).

Multi-description coding (MDC) is frequently utilized to separate content into a plurality of descriptions, which can be separately sent over a communication medium, to be aggregated when received to generate output content. The descriptions may be sent over one or more paths to the aggregator, and each of the descriptions is typically a compressed and encoded portion of the original content. In some examples, the separated content is organized into slice groups, and arbitrary slice ordering (ASO) for organizing slice groups. However, ASO has not been widely adopted, and thus, implementations of MDC utilizing ASO can pose interoperability problems in certain cases.

Thus, improvements in the capability to stream large files and media content from a mobile device onto a network are highly desirable.

SUMMARY

An apparatus, system, and method utilizing multi-description coding (MDC) to send streaming content to an aggregator. Some aspects of the disclosure utilize macroblock (MB)-based MDC, wherein the descriptions may be based on a region of interest (ROI) diversity, resolution diversity, and/or frame rate diversity. That is, one or more descriptions may include the ROI, and one or more descriptions may include non-ROI portions of the content. Here, the non-ROI portions may be sub-sampled and separated into a plurality of slices, by suitably distributing pixels into the slices. One or both of the ROI slice(s) and the non-ROI slice(s) may be further divided into multiple parts by distributing sequential frames in the source content into alternating or sequential cadences. Utilizing these algorithms, MB-based mapping is enabled without the need to utilize arbitrary slice ordering (ASI), improving interoperability with legacy systems.

In an aspect of the disclosure, a method of sending content includes segmenting a source scene into at least one region of interest portion and at least one non-region of interest portion. The method further includes sub-sampling the at least one non-region of interest portion into a plurality of lesser quality versions of each of the at least one non-region of interest portions, encoding the at least one region of interest portion and the plurality of lesser quality versions of the at least one non-region of interest portions into a plurality of descriptions, and transmitting the plurality of descriptions over a communications medium.

In another aspect of the disclosure, a method of receiving content includes receiving a first description corresponding to a region of interest portion of a scene, and receiving a second description corresponding to a sub-sampled non-region of interest portion of the scene. The method further includes decoding the at least one of the plurality of descriptions and combining the decoded descriptions to generate an output scene.

In another aspect of the disclosure, an apparatus for sending content includes a processor, a memory coupled to the processor, and a transmitter coupled to the processor. Here, the processor is configured to segment a source scene into at least one region of interest portion and at least one non-region of interest portion, to sub-sample the at least one non-region of interest portion into a plurality of lesser quality versions of each of the at least one non-region of interest portions, to encode the at least one region of interest portion and the plurality of lesser quality versions of the at least one non-region of interest portions into a plurality of descriptions, and to transmit the plurality of descriptions over a communications medium utilizing the transmitter.

In another aspect of the disclosure, an apparatus for receiving content includes a processor, a memory coupled to the processor, and a receiver coupled to the processor. Here, the processor is configured to receive a first description corresponding to a region of interest portion of a scene, utilizing the receiver, to receive a second description corresponding to a sub-sampled non-region of interest portion of the scene, utilizing the receiver, to decode the at least one of the plurality of descriptions, and to combine the decoded descriptions to generate an output scene.

In another aspect of the disclosure, a computer program product includes a computer-readable medium having code for segmenting a source scene into at least one region of interest portion and at least one non-region of interest portion, code for sub-sampling the at least one non-region of interest portion into a plurality of lesser quality versions of each of the at least one non-region of interest portions, code for encoding the at least one region of interest portion and the plurality of lesser quality versions of the at least one non-region of interest portions into a plurality of descriptions, and code for transmitting the plurality of descriptions over a communications medium.

In another aspect of the disclosure, a computer program product includes a computer-readable medium having code for receiving a first description corresponding to a region of interest portion of a scene, code for receiving a second description corresponding to a sub-sampled non-region of interest portion of the scene, code for decoding the at least one of the plurality of descriptions, and code for combining the decoded descriptions to generate an output scene.

In another aspect of the disclosure, an apparatus for sending content includes means for segmenting a source scene into at least one region of interest portion and at least one non-region of interest portion, means for sub-sampling the at least one non-region of interest portion into a plurality of lesser quality versions of each of the at least one non-region of interest portions, means for encoding the at least one region of interest portion and the plurality of lesser quality versions of the at least one non-region of interest portions into a plurality of descriptions, and means for transmitting the plurality of descriptions over a communications medium.

In another aspect of the disclosure, an apparatus for receiving content includes means for receiving a first description corresponding to a region of interest portion of a scene, means for receiving a second description corresponding to a sub-sampled non-region of interest portion of the scene, means for decoding the at least one of the plurality of descriptions, and means for combining the decoded descriptions to generate an output scene.

DETAILED DESCRIPTION

Figure 1:
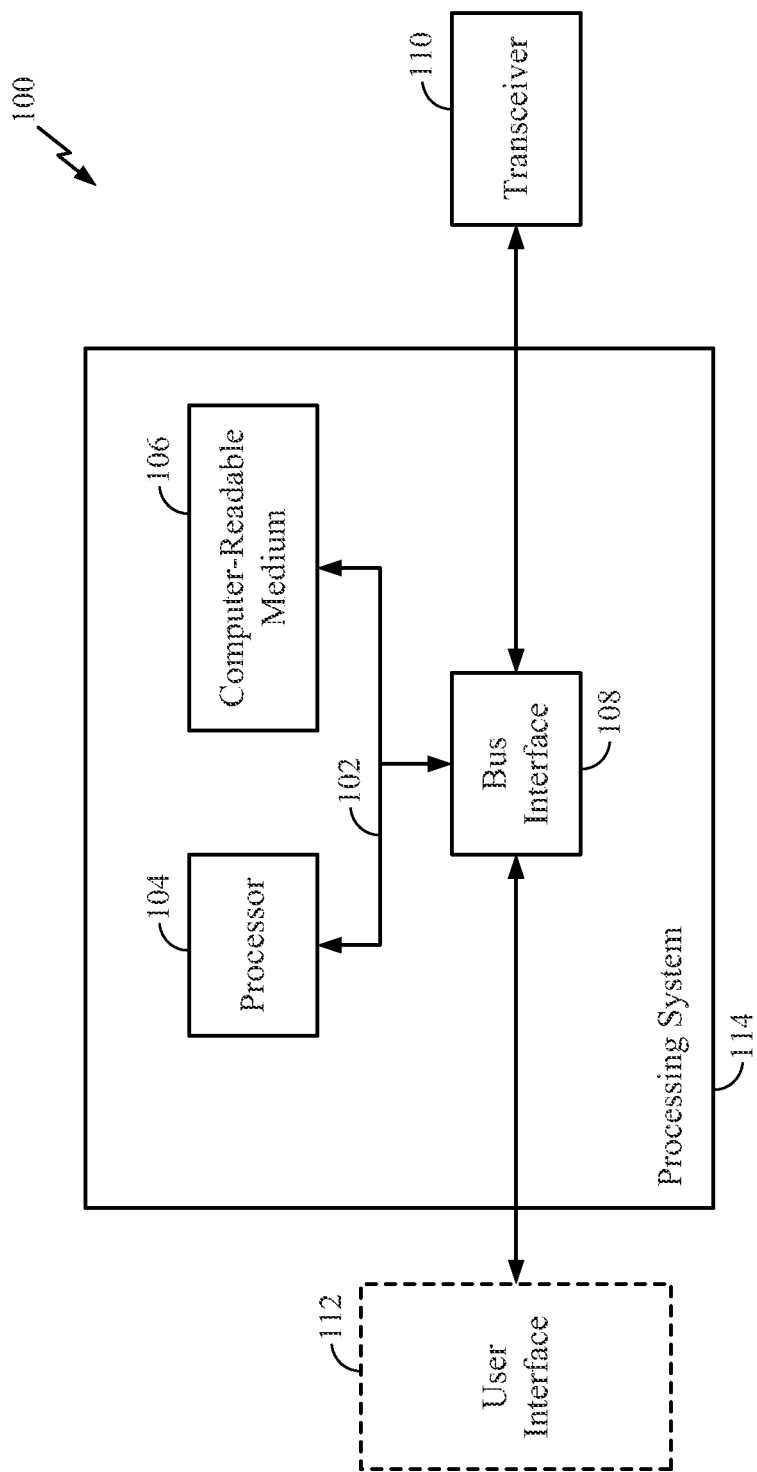
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Multi-Description Coding (MDC) is a coding technique for fragmenting content, such as a media stream, into multiple substreams, referred to as descriptions. Upon generation, each of the descriptions can be routed to an aggregator device, which may aggregate the descriptions to recover the content. In MDC, the descriptions are different from one another, but related to one another. That is, the encoding of the descriptions is generally such that any individual one of the descriptions can be decoded to recover the entire content, although a degradation in the quality may be realized if one or more of the descriptions fails to reach the aggregator. Thus, even if one of the streams fails to arrive at its destination, the receiver should still be able to recover the entire content, although some or all of the content may be at a relatively low quality.

MDC can be utilized to increase redundancy, e.g., for sending large files, typically utilizing a protocol such as FTP over a single link, or on a plurality of wireless channels from a single device. Utilization of MDC in this fashion reduces the amount of bandwidth required to send the content, since not all of the streams are necessary to be received to recover the content. Further, MDC provides improved robustness, since even if one of the streams is lost, the receiver may still recover the entire content, although some portions of it may be at a reduced quality.

In accordance with an aspect of the disclosure, a UE may dynamically encode the same content into multiple descriptions as the content is streamed to an aggregator.

Here, the aggregator may receive one or more of the streams. When the aggregator receives a plurality of the streams, it may selectively aggregate the streams together to recover the content. That is, the aggregator may select the best portion or portions from each of the descriptions, ideally to recover the original quality content prior to fragmentation and MDC encoding.

Figure 2:
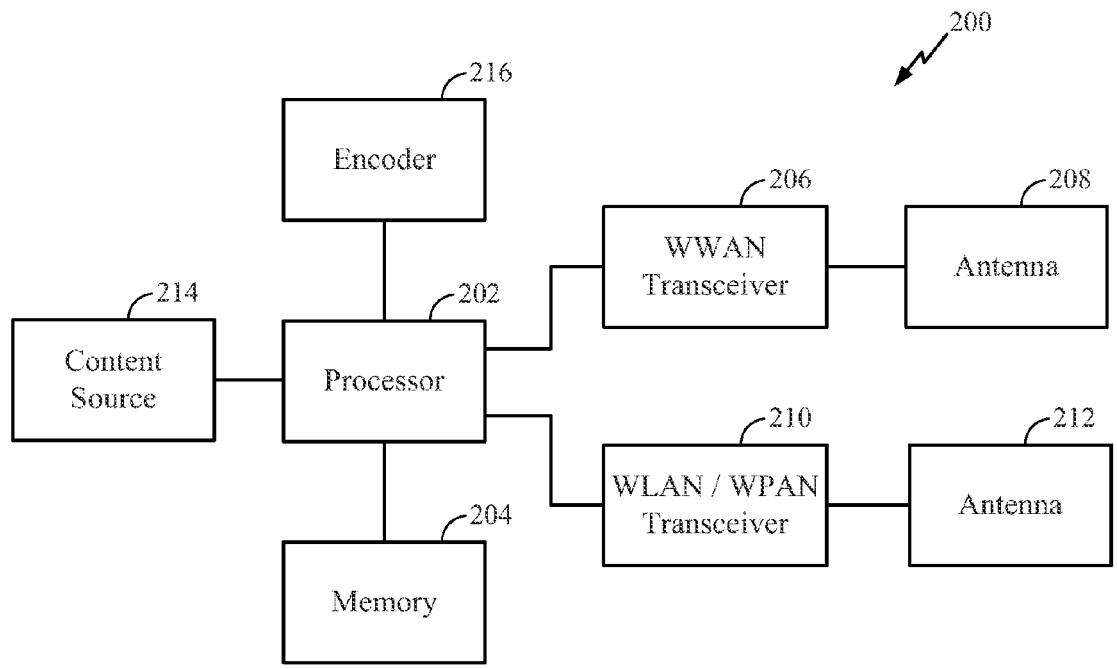
FIG. 2 is a simplified block diagram illustrating a content server apparatus.

FIG. 2 is a simplified block diagram illustrating a mobile server apparatus 200 in accordance with some aspects of the disclosure. The mobile server includes a processor 202. Here, the processor 202 may be the processor 104 illustrated in FIG. 1, or any other suitable processor or processing system. The processor 202 is coupled to a memory 204. The memory may be any suitable storage space capable of providing to the processor 202 a non-random aggregation of data, irrespective of its mode of storage or presentation.

The illustrated mobile server 200 further includes a wireless wide area network (WWAN) transceiver 206 for transmitting and receiving data over a suitable WWAN air interface utilizing an antenna 208. The WWAN air interface may follow any suitable protocol for wireless communication, such as but not limited to CDMA, TDMA, GSM, UMTS, cdma2000, LTE, WiMAX, etc.

The illustrated mobile server 200 further includes a wireless local area network (WLAN) and/or wireless personal area network (WPAN) transceiver 210, for transmitting and receiving data over a suitable WLAN and/or WPAN air interface utilizing an antenna 212. The WLAN/WPAN air interface may follow any suitable protocol for wireless communication, such as but not limited to IEEE 802.11, 802.15, Bluetooth™, Zigbee, etc. Here, communication utilizing the WLAN/WPAN air interface may be referred to as an out-of-band link, describing that the link may utilize a different band than that or those utilized by the WWAN transceiver 206.

The illustrated mobile server 200 further includes a content source 214. In some aspects, the content source 214 may be the same as the memory 204; that is, content may be stored in memory 204. In other aspects, the content source 214 may be one of the transceivers 206 or 210; that is, content may be received utilizing a respective air interface. In still other aspects, the content source 214 may be a still or video camera, a microphone, a sensor, or any other source of content that a user of the mobile server 200 may wish to share.

The illustrated mobile server 200 further includes an encoder 216 coupled to the processor 202. The encoder 216 is configured to perform the multi-description coding (MDC) of the content, e.g., to generate a plurality of descriptions of the content from the content source 214.

In some aspects of the disclosure, the mobile server 200 may be a conventional user equipment (UE) such as a mobile cellular telephone, wherein an MDC application may be software installed onto the device, such that the device may be configured to act as a mobile server 200.

Figure 3:
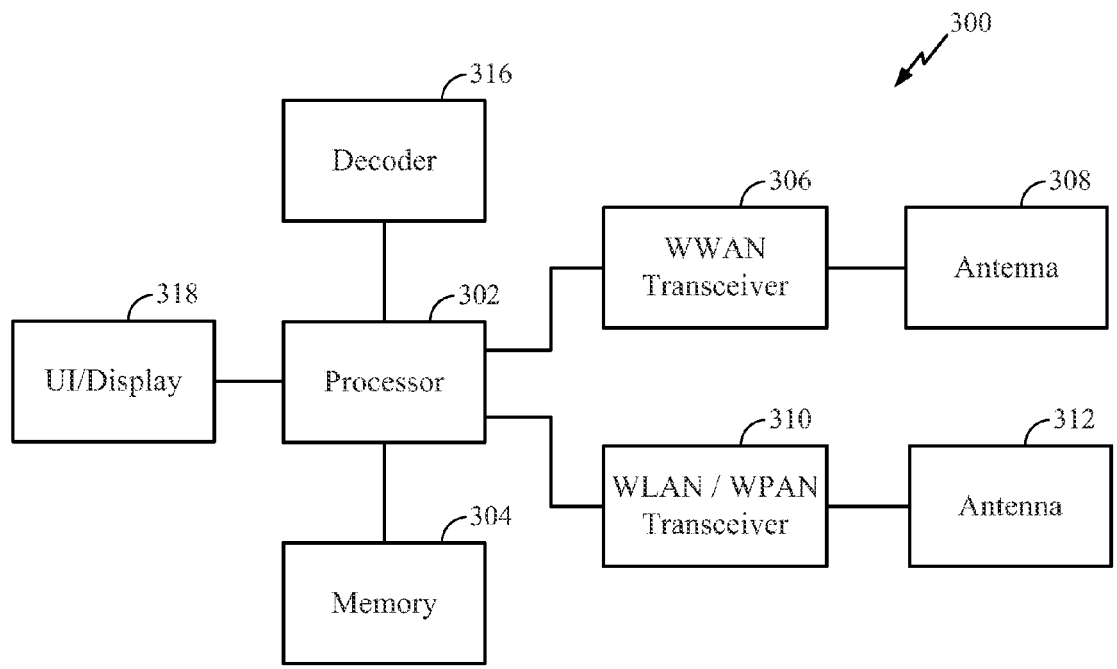
FIG. 3 is a simplified block diagram illustrating an aggregator apparatus.

FIG. 3 is a simplified block diagram illustrating an aggregator 300 in accordance with some aspects of the disclosure. The illustrated aggregator 300 includes a processor 302. Here, the processor 302 may be the processor 104 illustrated in FIG. 1, or any other suitable processor or processing system. The processor 302 is coupled to a memory 304. The memory may be any suitable storage space capable of providing to the processor 302 a non-random aggregation of data, irrespective of its mode of storage or presentation.

The illustrated aggregator 300 further includes a WWAN transceiver 306 for transmitting and receiving data over a suitable WWAN air interface utilizing an antenna 308. The WWAN air interface may follow any suitable protocol for wireless communication, such as but not limited to CDMA, TDMA, GSM, UMTS, cdma2000, LTE, WiMAX, etc.

The illustrated aggregator 300 further includes a wireless local area network (WLAN) and/or wireless personal area network (WPAN) transceiver 310, for transmitting and receiving data over a suitable WLAN and/or WPAN air interface utilizing an antenna 312. The WLAN/WPAN air interface may follow any suitable protocol for wireless communication.

The illustrated aggregator 300 further includes a decoder 316 coupled to the processor 302. The decoder 316 is configured to decode the MDC-encoded content received, e.g., from the mobile server 200 utilizing the WWAN transceiver 306, e.g., to aggregate the received description(s) to generate a version of the content. The illustrated aggregator 300 further includes a user interface 318 such as a display device, speaker, etc., so that the decoded content may be enjoyed by the user of the aggregator 300.

Figure 4:
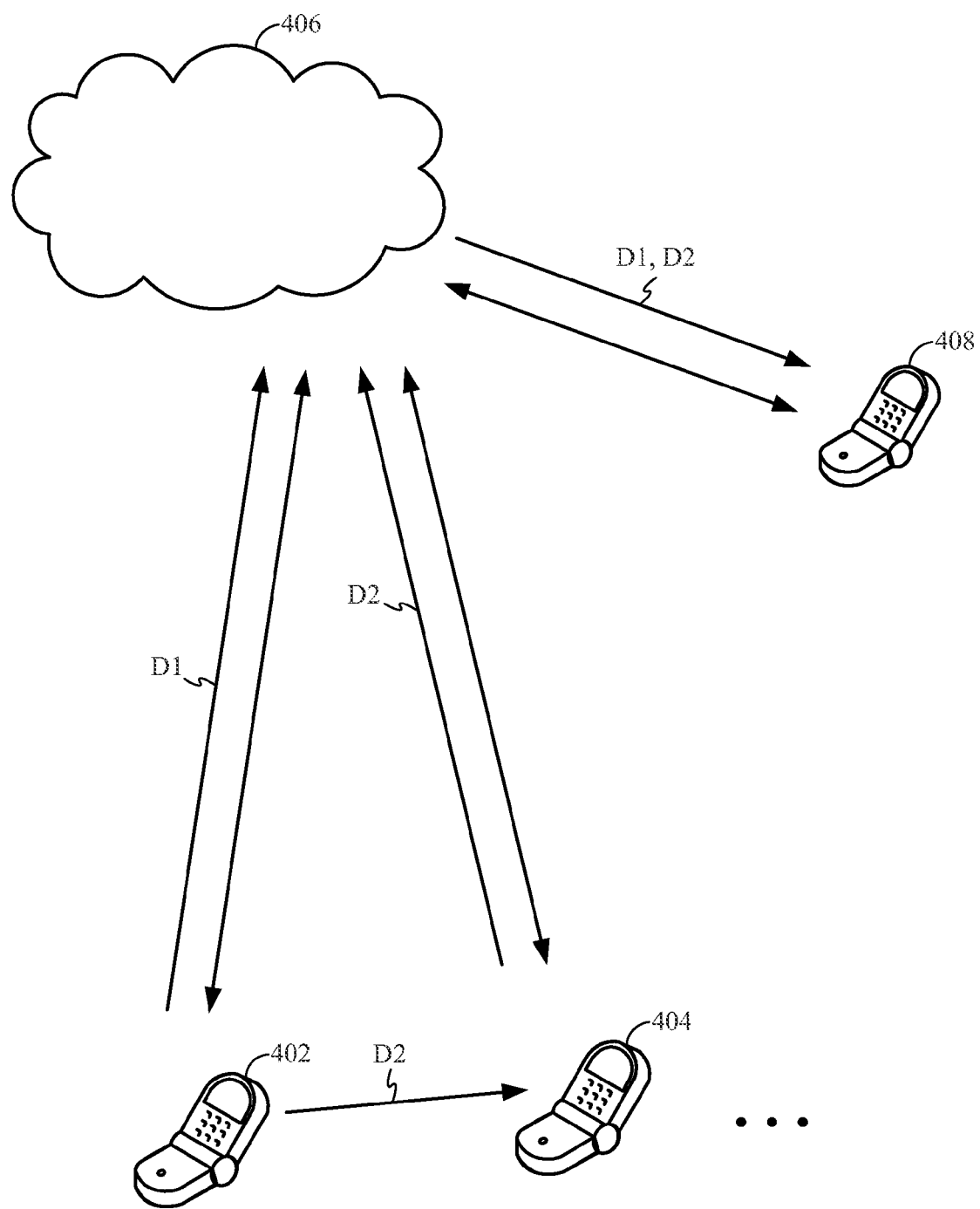
FIG. 4 is a schematic diagram illustrating a particular scheme utilizing multi-description coding.

FIG. 4 is a schematic diagram illustrating a particular scheme utilizing MDC in accordance with one aspect of the disclosure. Here, a mobile server 402 (e.g., the mobile server 200 illustrated in FIG. 2) and a cooperative helper node 404 (e.g., including the same components as the mobile server 200 illustrated in FIG. 2) may cooperate to provide multiple descriptions D1, and D2 of content to an aggregator 408 (e.g., the aggregator 300 illustrated in FIG. 3). Of course, various implementations may provide any suitable of descriptions beyond two, and each node, i.e., the mobile server 402 and the one or more helper nodes 404 may each provide one or more descriptions on a corresponding uplink. Here, after discovering and selecting the helper node 404, and generating the multiple descriptions D1 and D2, the mobile server 402 may transmit a first description D1 over an uplink. The mobile server 402 may share the second description D2 with the helper node 404, e.g., by way of an out-of-band link, such that the helper node 404 may then transmit the second description D2 over a corresponding uplink.

The cloud 406 represents the WWAN, and may include base stations, servers, and other nodes for routing the descriptions D1 and D2 to the aggregator 408. For example, the cloud 406 may include the Internet. Here, the cloud 406 provides the multiple descriptions D1 and D2 to the aggregator 408, e.g., on a downlink. Thus, the aggregator 408 may selectively combine the multiple descriptions D1 and D2 to obtain a version of the original content from the mobile server 402.

Figure 5:
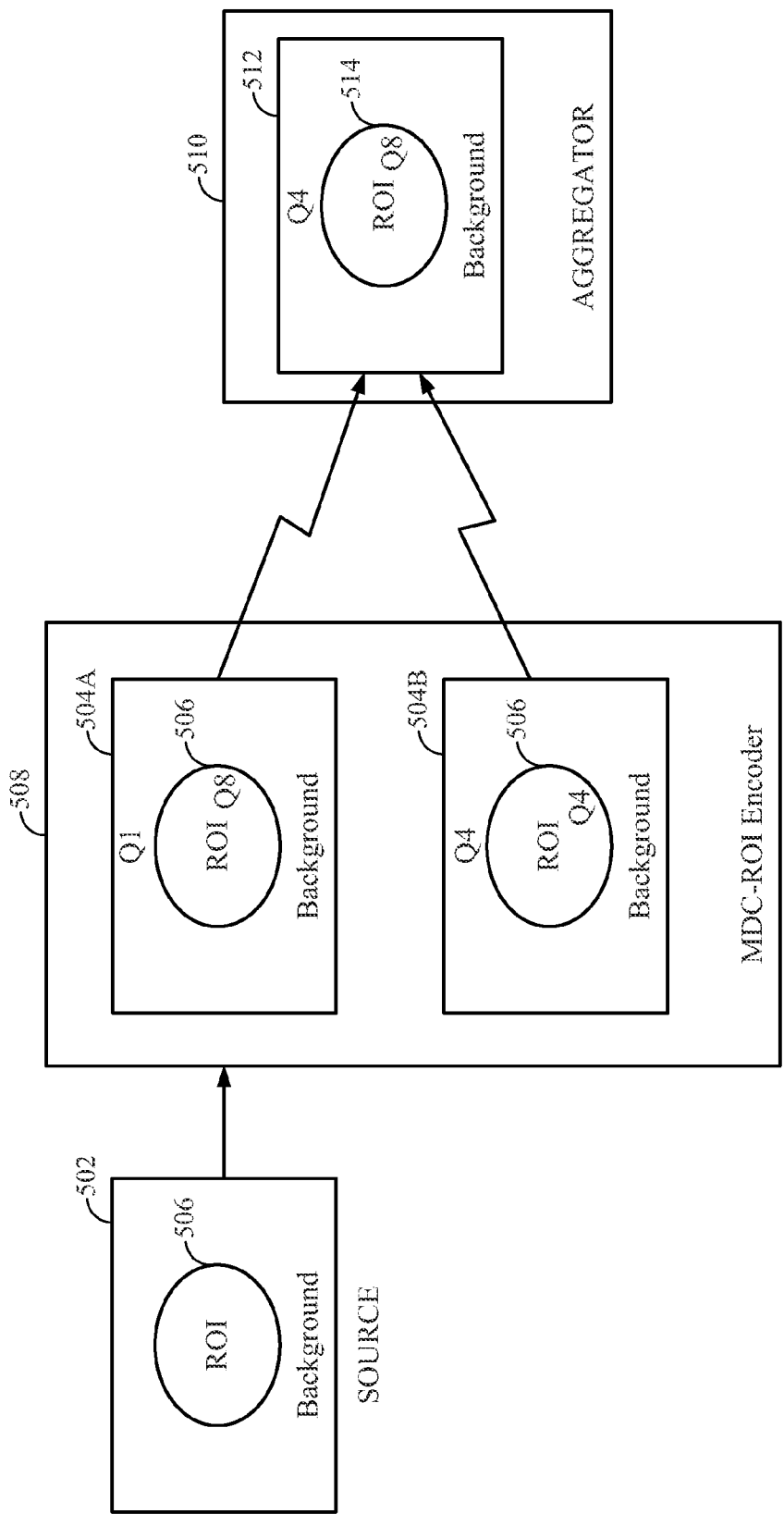
FIG. 5 is a schematic diagram illustrating region of interest diversity-based multi-description coding.

FIG. 5 illustrates the fragmentation of a source scene 502 into slices 504A and 504B based on a region of interest (ROI) 506, and encoding the slices 504A-B into multiple descriptions. Here, a scene may refer to one or more images, e.g., a still image, or a series of images adapted to be sequentially viewed to create a motion picture, etc. In ROI-based partitioning of a source scene 502, one or more objects in a scene may be identified as a ROI. Each ROI may be identified as such and flagged and/or prioritized based on spatio-temporal activity, eye tracking, or other suitable metrics of interest assessment. In some aspects of the disclosure, a single segment map may be applied for an entire scene, and objects, including their range of motion, can form the respective regions (ROI and non-ROI).

An encoder 508 may separate the partitions based on the ROI 506, and generate a plurality of descriptions 504A and 504B based on the ROI 506. That is, a source scene 502 may be segmented into multiple levels of ROI and non-ROI. For example, objects in a scene with the largest acceleration or motion may be identified as a level 1 ROI, having a highest priority; and pixels surrounding the level 1 ROI with low or medium acceleration or motion may be identified as a level 2 ROI. Remaining portions of the scene including the background may be identified as a level 3 ROI. Here, levels 1 to 3 refer generically to different priorities, and as discussed below, different encoding qualities may be applied to the respective ROI levels.

Priority levels may be assigned to regions of the scene based on a suitable interest metric. Of course, any suitable number of levels of priority, and forms of encoding of the various ROI-based slices may be utilized in a particular implementation.

In the illustration in FIG. 5, the encoder 508 separates the source scene 502 into the two descriptions 504A-B, and encodes the descriptions differently based on the ROI 506. In the first description 504A, the ROI portion is encoded at a highest quality, denoted Q8. In one example, this quality may be a full resolution quality corresponding to the quality of the source scene 502. The remaining, non-ROI portion of the first description 504A is encoded at a lowest quality, denoted Q1. In this way, if the first description 504A alone is received at the aggregator 510, the ROI portion can be recovered at full resolution, while the non-ROI portion can be recovered at a relatively low resolution. Further, the encoder 508 encodes both the ROI portion and the non-ROI portion of the second description 504B at a medium quality, denoted Q4. Here, the medium quality may be a resolution in between that of Q1 and Q8. In this way, if the second description 504B alone is received at the aggregator 510, the entire scene can be recovered at a medium resolution.

When both descriptions are received at the aggregator 510, the descriptions 504A-B may be decoded and selectively combined to generate an output scene 512. Here, the aggregator 510 may select the respective ROI and non-ROI portions out of each of the received descriptions based on the quality of the respective portions. That is, while the ROI portion of the first description 504A has the highest quality, the non-ROI portion of the second description 504B has a better quality than the non-ROI portion of the first description 504A. Thus, the aggregator 510 selectively combines the ROI portion of the first description 504A with the non-ROI portion of the second description 504B to generate the output scene 512, having an ROI portion 514 at the highest quality Q8, and a non-ROI portion at the medium quality Q4.

In a further aspect of the disclosure, adjustments to a frame rate may be utilized to further reduce the overall bit allocation. For example, the lowest interest level regions may not be coded, or may be coded as skips in alternate frames. As will be discussed in further detail below, a combination of ROI-based diversity with frame rate diversity can reduce overhead in wireless transmissions.

Figure 6:
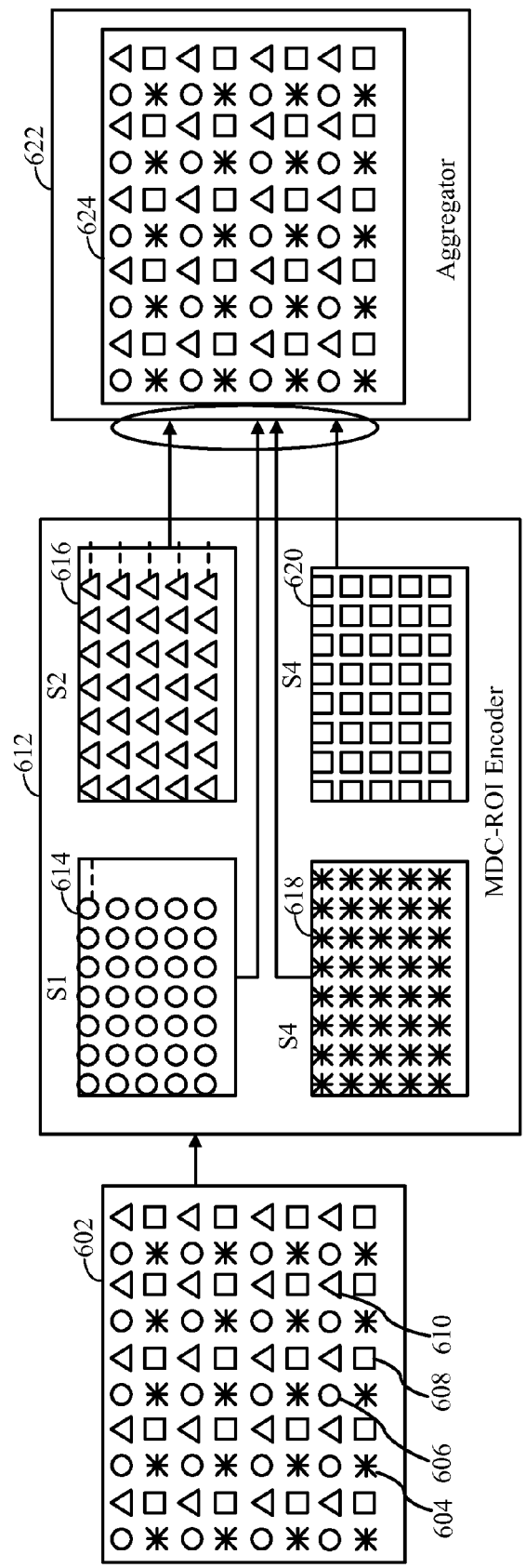
FIG. 6 is a schematic diagram illustrating resolution diversity-based multi-description coding.

FIG. 6 is a simplified diagram illustrating resolution diversity, wherein a scene may be fragmented into slices by sub-sampling all or portions of the scene, such that each slice may carry a fraction of the resolution of the scene. In the illustrated example, a source scene 602 includes a plurality of pixels. Here, the pixels are illustrated as being within one of four groups, including star pixels 604, circle pixels 606, square pixels 608, and triangle pixels 610. That is, the respective star, circle, square, and triangle shapes are only representative or symbolic in nature, and do not necessarily represent an image displayed in the scene 602. It is shown that every second horizontal row of pixels includes alternating circle pixels 606 and triangle pixels 610; while the interleaving horizontal rows of pixels include alternating star pixels 604 and square pixels 608. Of course, any pattern of pixels may be utilized in a particular embodiment. Further, the sub-sampling may be into any suitable number of groups. For example, groups of two may be generated by sub-sampling the pixels in every other horizontal row or in every other vertical column into respective slices. When a scene is equally sub-sampled into M slices, each slice carries a resolution of 1/M relative to the resolution of the source scene. Of course, the scene may be divided into non-equal slices, with a variable resolution per slice.

In the illustration, the source scene is forwarded to an encoder 612 for sub-sampling and encoding. The encoder 612 may separate the pixels from the source scene 602 into the slices 614, 616, 618, and 620 by sub-sampling the source scene 602 and generating a plurality of (e.g., four) groups of pixels. In the illustrated example, all the circle pixels 606 are grouped into a first slice 614, all the triangle pixels 610 are grouped into a second slice 616, all the star pixels 604 are grouped into a third slice 618, and all the square pixels 608 are grouped into a fourth slice 620. Because of the distribution of the respective pixels within the source scene 602, and their predetermined grouping into the respective slices by the encoder 612, such a separation results in a plurality of slices, each of which may be expanded to a full-size image representing the entire scene. Additionally, any subset of two or three of the slices may be combined and expanded to a full-size image representing the entire scene with a resolution between that of one of the slices and that of the source scene. That is, one of any various suitable processing methods may be utilized to expand a subset of one, two, or three of the four slices to result in a full-size image, including but not limited to interpolation over any missing pixels. Of course, all of the slices may be recombined to obtain the original source scene.

The encoder 612 may encode the slices 614, 616, 618, and 620 utilizing one or more suitable encoding schemes, in order to generate a plurality of (e.g., four) descriptions to be sent to an aggregator 622. The descriptions may be sent to the aggregator utilizing any suitable communications medium, such as a wireless air interface, a wired interface, etc. The aggregator 622 may receive one or more of the respective descriptions, based on characteristics of the communications medium. That is, one or more of the descriptions may be lost in transit due to interference, noise, fading, or any other reason for a loss of a signal. The aggregator 622 may then decode the received descriptions, combine the pixels in the received descriptions by re-ordering them into an order corresponding to that of the source scene 602, and generate a destination image 624 utilizing the recovered pixels. When all of the plurality of descriptions are received at the aggregator, the destination image 624 may be of the same resolution and quality as the source scene 602. When less than all of the plurality of descriptions are received at the aggregator, the received descriptions may be decoded and combined, and the resulting image may be up-converted to compensate for the pixels from the missing one or more descriptions that failed to be received.

In some aspects of the disclosure, different regions of a source scene may be fragmented into resolution-based slices, rather than an entire source scene. For example, as discussed below, a ROI portion and a non-ROI portion may independently be fragmented into resolution-based slices. Here, certain portions of a description may be selectively combined by the aggregator to gather the best resolution available from each region of the scene. Additionally, resolution diversity can be combined with frame rate diversity, to fragment a subsampled scene or region of a scene into a plurality of descriptions having different frames from the scene, as described below.

Figure 7:
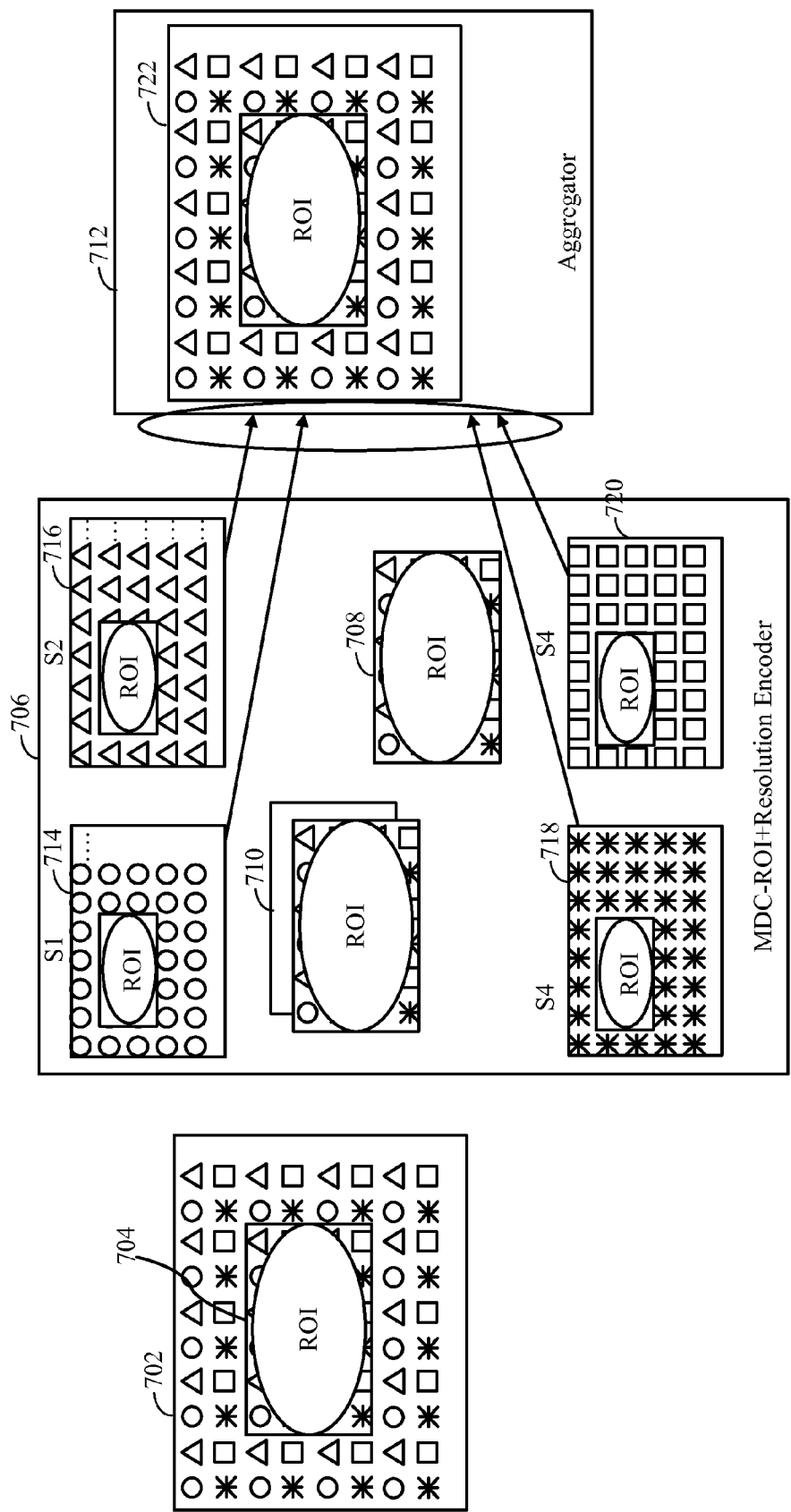
FIG. 7 is a schematic diagram illustrating multi-description coding utilizing region of interest diversity, resolution diversity, and frame rate diversity.

FIG. 7 is a simplified diagram illustrating combined diversity, including ROI diversity, resolution diversity, and frame rate diversity. Combinations of various forms of fragmentation can result in a reduction in transmission overhead when the descriptions are transmitted over a communication interface to the aggregator.

In one example, ROI-based partitioning may be combined with resolution diversity. For example, a source scene 702 may include a plurality of pixels. Here one or more region(s) of interest 704 may be identified within the source scene by any suitable metric of interest assessment. The source scene may be provided to an encoder 706 for fragmenting the source scene 702 into slices and encoding the respective slices.

Here, the source scene 702 may be segmented such that the ROI 704 creates a separate slice 708, which is thereby encoded into and transmitted as a separate description. In accordance with various aspects of the disclosure, the slice 708 including the ROI 704 may be encoded at the full resolution corresponding to the resolution of the source scene 702. Alternately, the slice 708 including the ROI 704 may be encoded at a lesser resolution compared to the source scene 702 to decrease overhead during transmission. In some aspects of the disclosure, a plurality of descriptions corresponding to the slice 708 may be created at one or more resolutions, to improve robustness in case one or more of those descriptions is lost during transmission. Here, the description having the resolution of the highest quality would be selected when received by the aggregator 712.

Further, the background, or non-ROI region(s) of the source scene 702 may be sub-sampled such that the pixels of the non-ROI region of the source scene 702 are separated into a plurality of slices, e.g., slices 714, 716, 718, and 720. These slices may then be encoded into respective descriptions to be transmitted over the communications medium to the aggregator 712.

In the descriptions corresponding to the non-ROI slices 714, 716, 718, and 720, macroblocks (MBs) corresponding to the ROI portion of the scene may be skipped to reduce overhead. Alternately, the MBs corresponding to the ROI portion may be encoded at a different quality from the background, i.e., non-ROI portion. That is, the ROI portion may be encoded at a relatively lower quality, while the non-ROI portion may be sub-sampled to achieve resolution diversity. Alternately, the ROI portion may be encoded utilizing sub-sampling in the same or a different way from the background, i.e., non-ROI portion in that slice.

Here, MBs correspond to a block or group of pixels. For example, a MB may be a block of 256 pixels arranged in a 16 by 16 pattern.

At the aggregator 712, some of the descriptions may arrive over the communications medium, while other ones of the descriptions may be lost in transit. Here, the aggregator 712 may decode and selectively combine the received descriptions, such as to utilize the best portions of the image from the received descriptions. For example, if all descriptions are received at the aggregator 712, then the higher quality ROI description 708 can be merged with the re-ordered pixels of the non-ROI descriptions 714, 716, 718, and 720 to obtain a full resolution image 722. Alternately, if less than all of the descriptions are received at the aggregator 712, then the aggregator 712 may select the highest quality image portions from the ROI description(s) and the non-ROI description(s) received, and combine the selected descriptions by pixel merging (in the case of resolution diversity utilized for the non-ROI descriptions) and MB replacement (in the case of the ROI description being received).

In a further aspect of the present disclosure, frame rate diversity may be utilized in conjunction with ROI diversity and/or resolution diversity. Frame rate diversity generally refers to the carrying by one or more of the multiple descriptions of a fraction of the frames of the source scene. For example, a pair of descriptions may include alternate cadences of the source frames. Of course, the fraction of the frames from the source scene may be other than ½, and any suitable number of descriptions may include any suitable portion, being the same or different from one another, of the frames of the source scene.

In an example, referring again to FIG. 7, a ROI 704 may be identified as above in the source scene 702. The ROI may be separated by the encoder 706 into a separate slice, and encoded into a description at a suitable frame rate. For example, for maximal quality in the ROI, the ROI description may be encoded at a full frame rate corresponding to the frame rate of the source scene 702. In some aspects of the disclosure, the ROI description may be encoded at less than the full frame rate, e.g., utilizing two slices 708 and 710, each including half the full frame rate and containing alternating cadences of the frames from the source scene 702.

Further, the non-ROI region(s) of the source scene 702 may be sub-sampled as above, e.g., to generate four slices 714, 716, 718, and 720, each having one quarter of the pixels from the source scene 702. In addition, the non-ROI slices 714, 716, 718, and 720 may each include one quarter, or one half, or any other suitable fraction of the frames from the source scene to further reduce overhead when transmitted over the transmission medium. Further, one or more of the groups of pixels (e.g., the first slice 714) may be further divided into a plurality of frame-rate diversity slices, e.g., two slices including alternating cadences of frames, to be transmitted as descriptions. That is, a particular description may be a quarter resolution non-ROI portion of a source scene, at a half frame rate, including every second frame.

Thus, in accordance with various aspects of the present disclosure, variations on scene partitioning between ROI portions and non-ROI portions, resolution diversity, and/or frame rate diversity in MDC-based systems can lead to a simplified MB-based quality assignment with relatively few slices being required, resulting in a reduced slice overhead in H.264 encoding. Further, MB-based mapping is enabled without the need to utilize arbitrary slice ordering (ASO), which has not been widely adopted and can pose interoperability problems when utilizing ROI-based encoding.

Figure 8:
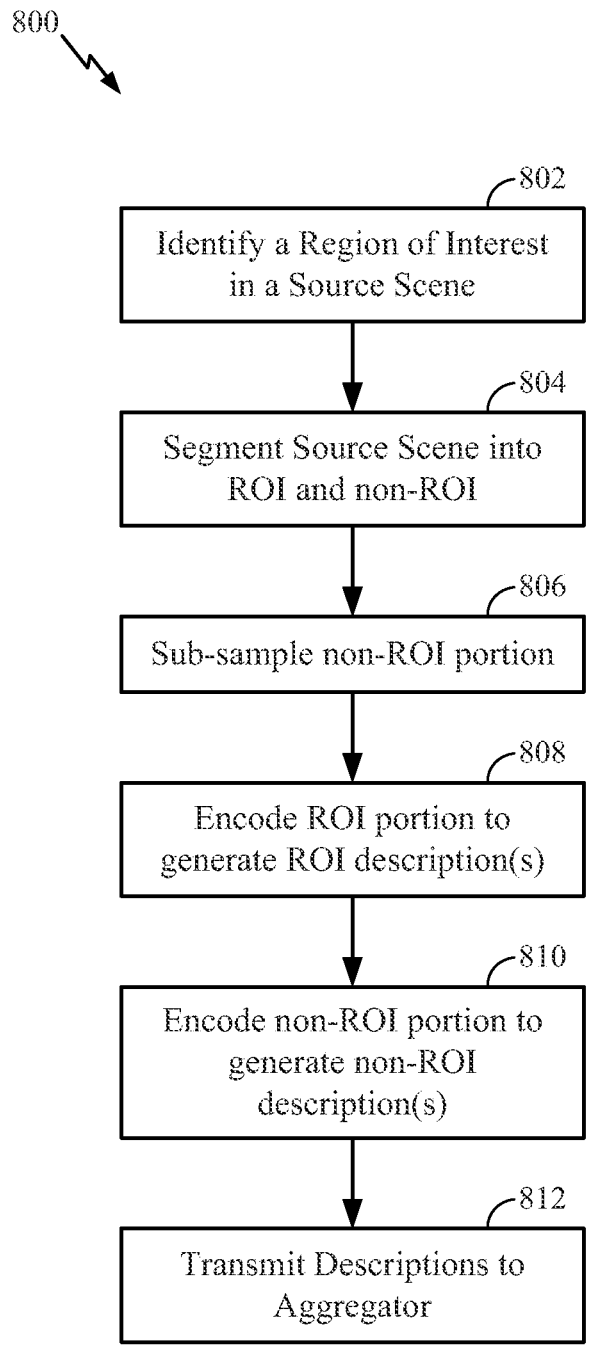
FIG. 8 is a flow chart illustrating a process for a streaming content server.

FIG. 8 is a flow chart illustrating a process 800 for sending content from a source to an aggregator. In some aspects of the disclosure, the process 800 may be implemented by the processing system 114 illustrated in FIG. 1. In other aspects of the disclosure, the process 800 may be implemented by the mobile server apparatus 200 illustrated in FIG. 2. In still other aspects of the disclosure, the process 800 may be implemented by any suitable apparatus for sending content to an aggregator. In block 802, the process identifies a ROI within the source scene, and in block 804, the process segments the source scene into at least one ROI portion and at least one non-ROI portion. In block 806, the process sub-samples the at least one non-ROI portion into a plurality of lesser quality versions of each of the at least one non-ROI portions. In block 808, the process encodes the at least one ROI portion to generate a ROI description, and in block 810, the process encodes the plurality of lesser quality versions of each of the at least one non-ROI portions into a plurality of non-ROI descriptions. In block 812, the process transmits the generated descriptions over a communications medium to the aggregator.

Figure 9:
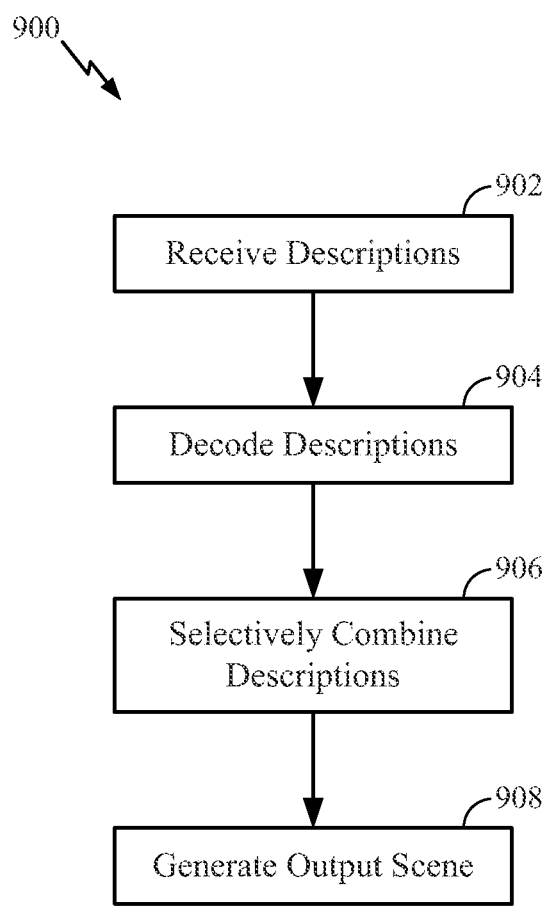
FIG. 9 is a flow chart illustrating a process for an aggregator for receiving multiple descriptions of content.

FIG. 9 is a flow chart 900 illustrating a process 900 for receiving content from a source at an aggregator. In some aspects of the disclosure, the process 900 may be implemented by the processing system 114 illustrated in FIG. 1. In other aspects of the disclosure, the process 900 may be implemented by the aggregator 300 illustrated in FIG. 3. In still other aspects of the disclosure, the process 900 may be implemented by any suitable apparatus for sending content to an aggregator. In block 902, the process receives a first description corresponding to a region of interest portion of a scene, and a second description corresponding to a sub-sampled non-ROI portion of the scene. In block 904, the process decodes the received descriptions, and in block 906, the process selectively combines the decoded descriptions in accordance with the resolution or quality of respective portions of the received descriptions. In block 908, the process generates an output scene based on the selectively combined descriptions.

Referring to FIG. 1 and FIG. 2, in one configuration, an apparatus for sending content may include means for segmenting a source scene into at least one region of interest portion and at least one non-region of interest portion; means for sub-sampling at least a portion of a source scene into a plurality of lesser quality versions of each of the respective portions; means for encoding respective portions into a plurality of descriptions; means for transmitting the plurality of descriptions over a communications medium; means for identifying a region of interest portion of a source scene in accordance with a metric of interest assessment; means for generating a plurality of slices from a region of interest portion; and/or means for generating a plurality of slices from a plurality of lesser quality versions of at least one non-region of interest portions. The aforementioned means may be the processing system 114 configured to perform the functions recited by the aforementioned means. As described supra, the processing system 114 may include the processor 202, the encoder 216, and the memory 204. As such, in one configuration, the aforementioned means may be the processor 202, the encoder 216, the helper node manager 218, the memory 204, the WWAN transceiver 206, and the WLAN/WPAN transceiver 210 configured to perform the functions recited by the aforementioned means.

In another configuration, referring to FIG. 1 and FIG. 3, an apparatus for receiving content may include means for receiving a description corresponding to a region of interest portion of a scene; means for receiving a description corresponding to a sub-sampled non-region of interest portion of the scene; means for decoding a plurality of descriptions; means for combining the decoded descriptions to generate an output scene; means for selecting a portion of the received descriptions to combine in accordance with a quality of the received descriptions; means for selecting between descriptions based on which description has a resolution of the highest quality; means for merging frames from descriptions to provide an increased frame rate; means for merging pixels of descriptions to provide an increased resolution; and/or means for merging frames from descriptions to provide an increased frame rate. The aforementioned means may be the processing system 114 configured to perform the functions recited by the aforementioned means. As described supra, the processing system 114 may include the processor 302, the decoder 310, and the memory 304. As such, in one configuration, the aforementioned means may be the processor 302, the decoder 310, the memory 304, the WWAN transceiver 306, and the WLAN/WPAN transceiver 310 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of sending content, comprising:
   segmenting a source scene a region of interest portion and a non-region of interest portion;
   sub-sampling the non-region of interest portion into a plurality of lesser quality versions of the non-region of interest portion;
   encoding the region of interest portion and each of the plurality of lesser quality versions of the non-region of interest portion into a plurality of descriptions, wherein the region of interest portion is encoded at a full or lower resolution compared to the source scene and the plurality of lesser quality versions of the non-region of interest portion are encoded at an equal or lower resolution compared to the resolution of the region of interest portion, and wherein the region of interest portion and each of the plurality of lesser quality versions of the non-region of interest portion are encoded separately into a respective description of the plurality of descriptions; and
   transmitting the encoded plurality of descriptions as separate descriptions, without combining, over a communications medium.

2. The method of claim 1, further comprising identifying the region of interest portion of the source scene in accordance with a metric of interest assessment.

3. The method of claim 2, wherein the metric of interest assessment corresponds to an image texture or a motion of an imaged object in the source scene.

4. The method of claim 1, wherein the encoding comprises generating a plurality of slices from the region of interest portion.

5. The method of claim 4, wherein the source scene comprises a plurality of frames, and wherein each of the plurality of slices comprises a fraction of the frames from the source scene.

6. The method of claim 5, wherein the fraction is one-half, and wherein the plurality of slices comprises alternating cadences of the frames.

7. The method of claim 1, wherein the encoding comprises generating a plurality of slices from each of the plurality of lesser quality versions of the non-region of interest portion.

8. The method of claim 7, wherein the source scene comprises a plurality of frames, and wherein each of the plurality of slices comprises a fraction of the frames from the source scene.

9. An apparatus for sending content, comprising:
a processor, and a memory coupled to the processor; and
a transmitter coupled to the processor, wherein the processor is configured to:
  segment a source scene into a region of interest portion and a non-region of interest portion;
  sub-sample the non-region of interest portion into a plurality of lesser quality versions of the non-region of interest portion;
  encode the region of interest portion and each of the plurality of lesser quality versions of the non-region of interest portions into a plurality of descriptions, wherein the region of interest portion is encoded at a full or lower resolution compared to the source scene and the plurality of lesser quality versions of the non-region of interest portion are encoded at an equal or lower resolution compared to the resolution of the region of interest portion, and wherein the region of interest portion and each of the plurality of lesser quality versions of the non-region of interest portion are encoded separately into a respective description of the plurality of descriptions; and
  transmit the encoded plurality of descriptions as separate descriptions, without combining, over a communications medium utilizing the transmitter.

10. The apparatus of claim 9, wherein the processor is further configured to identify the region of interest portion of the source scene in accordance with a metric of interest assessment.

11. The apparatus of claim 10, wherein the metric of interest assessment corresponds to an image texture or a motion of an imaged object in the source scene.

12. The apparatus of claim 9, wherein the encoding comprises generating a plurality of slices from the region of interest portion.

13. The apparatus of claim 12, wherein the source scene comprises a plurality of frames, and wherein each of the plurality of slices comprises a fraction of the frames from the source scene.

14. The apparatus of claim 13, wherein the fraction is one-half, and wherein the plurality of slices comprises alternating cadences of the frames.

15. The apparatus of claim 9, wherein the encoding comprises generating a plurality of slices from each of the plurality of lesser quality versions of the non-region of interest portion.

16. The apparatus of claim 15, wherein the source scene comprises a plurality of frames, and wherein each of the plurality of slices comprises a fraction of the frames from the source scene.

17. A non-transitory computer-readable medium storing computer executable code, comprising:
code for segmenting a source scene into a region of interest portion and a non-region of interest portion;
code for sub-sampling the non-region of interest portion into a plurality of lesser quality versions of the non-region of interest portion;
code for encoding the one region of interest portion and the plurality of lesser quality versions of the non-region of interest portion into a plurality of descriptions, wherein the region of interest portion is encoded at a full or lower resolution compared to the source scene and the plurality of lesser quality versions of the non-region of interest portion are encoded at an equal or lower resolution compared to the resolution of the region of interest portion, and wherein the region of interest portion and each of the plurality of lesser quality versions of the non-region of interest portion are encoded separately into a respective description of the plurality of descriptions; and
code for transmitting the encoded plurality of descriptions as separate descriptions, without combining, over a communications medium.

18. The computer-readable medium of claim 17, further comprising code for identifying the region of interest portion of the source scene in accordance with a metric of interest assessment.

19. The computer-readable medium of claim 18, wherein the metric of interest assessment corresponds to an image texture or a motion of an imaged object in the source scene.

20. The computer-readable medium of claim 17, wherein the code for encoding comprises code for generating a plurality of slices from the region of interest portion.

21. The computer-readable medium of claim 19, wherein the source scene comprises a plurality of frames, and wherein each of the plurality of slices comprises a fraction of the frames from the source scene.

22. The computer-readable medium of claim 20, wherein the fraction is one-half, and wherein the plurality of slices comprises alternating cadences of the frames.

23. The computer-readable medium of claim 17, wherein the code for encoding comprises code for generating a plurality of slices from each of the plurality of lesser quality versions of the non-region of interest portion.

24. The computer-readable medium of claim 22, wherein the source scene comprises a plurality of frames, and wherein each of the plurality of slices comprises a fraction of the frames from the source scene.

25. An apparatus for sending content, comprising:
means for segmenting a source scene into a region of interest portion and a non-region of interest portion;
means for sub-sampling the non-region of interest portion into a plurality of lesser quality versions the non-region of interest portion;
means for encoding the region of interest portion and each of the plurality of lesser quality versions of the non-region of interest portion into a plurality of descriptions, wherein the region of interest portion is encoded at a full or lower resolution compared to the source scene and the plurality of lesser quality versions of the non-region of interest portion are encoded at an equal or lower resolution compared to the resolution of the region of interest portion, and wherein the region of interest portion and each of the plurality of lesser quality versions of the non-region of interest portion are encoded separately into a respective description of the plurality of descriptions; and means for transmitting the encoded plurality of descriptions as separate descriptions, without combining, over a communications medium.

26. The apparatus of claim 25, further comprising means for identifying the region of interest portion of the source scene in accordance with a metric of interest assessment.

27. The apparatus of claim 26, wherein the metric of interest assessment corresponds to an image texture or a motion of an imaged object in the source scene.

28. The apparatus of claim 25, wherein the means for encoding comprises means for generating a plurality of slices from the region of interest portion.

29. The apparatus of claim 28, wherein the source scene comprises a plurality of frames, and wherein each of the plurality of slices comprises a fraction of the frames from the source scene.

30. The apparatus of claim 29, wherein the fraction is one-half, and wherein the plurality of slices comprises alternating cadences of the frames.

31. The apparatus of claim 25, wherein the means for encoding comprises means for generating a plurality of slices from each of the plurality of lesser quality versions of the non-region of interest portion.

32. The apparatus of claim 31, wherein the source scene comprises a plurality of frames, and wherein each of the plurality of slices comprises a fraction of the frames from the source scene.

* * * * *